Jan. 2, 1951 L. A. KING 2,536,646
ELECTRONIC KEYING DEVICE
Filed Feb. 18, 1946
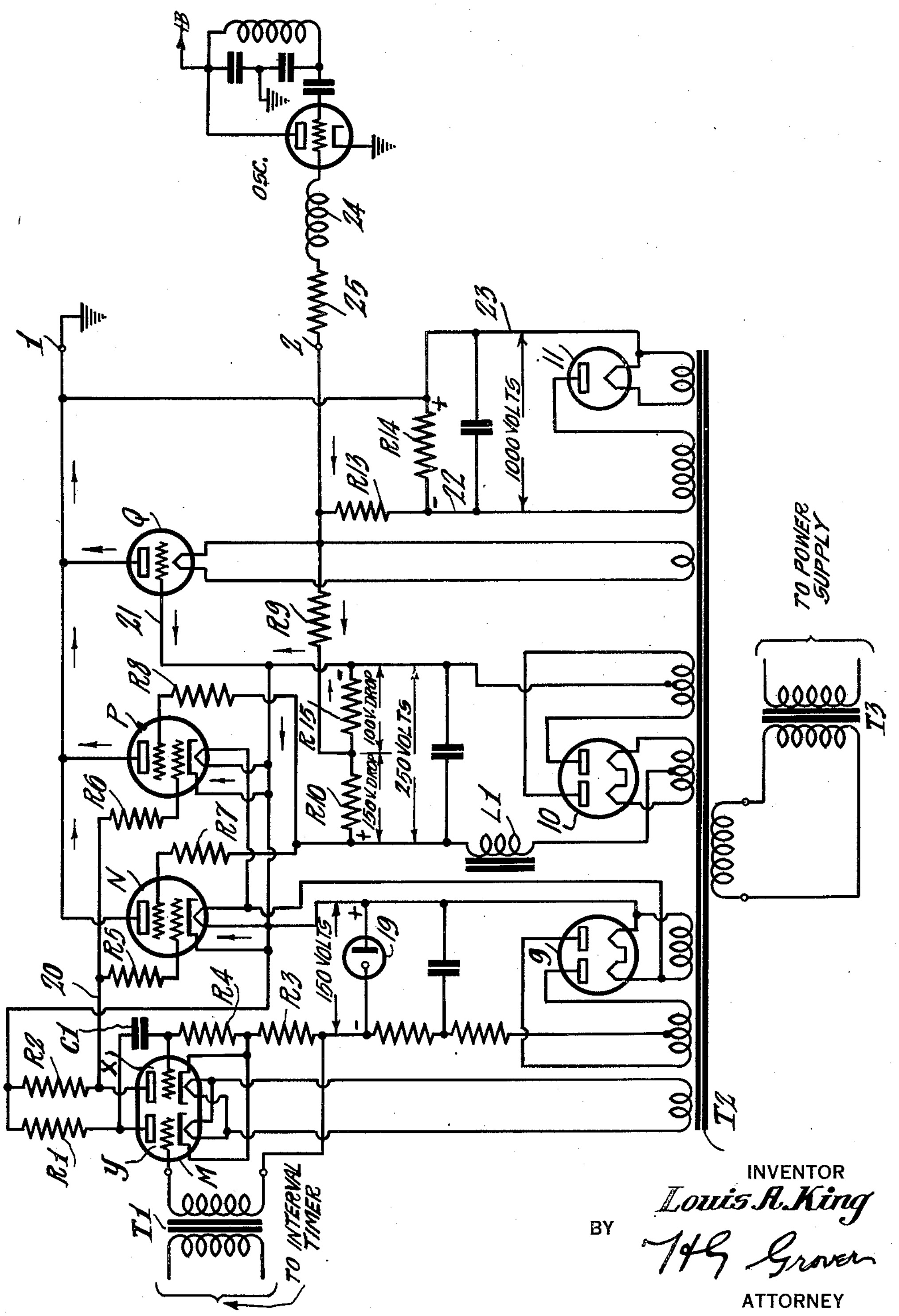
INVENTOR
Louis A. King
BY
H. G. Grover
ATTORNEY Patented Jan. 2, 1951 2,536,646

UNITED STATES PATENT OFFICE 2,536,646

ELECTRONIC KEYING DEVICE

Louis A. King, Haddonfield, N. J., assignor to Radio Corporation of America, a corporation of Delaware Application February 18, 1946, Serial No. 648,477

6 Claims. (Cl. 250—27)

This invention relates to electronic keying devices.

Heretofore it has been known to employ keying or relay systems using mechanical relays for controlling a power oscillator. In such known systems, the variation in pick-up and drop-out time of the relay amounts to an appreciable proportion of the time duration of ultra short time duration control pulses. By way of example, a mechanical relay may have a pick-up and drop-out time of 0.1 second. Hence, such known systems cannot be used to provide controllable output periods of extremely short duration of the order of .001 second, for example.

An object of the invention is to provide an electronic keying device which enables accurate high speed keying for periods of 0.001 second duration and longer.

Another object of the invention is to provide a fast operating electronic keying device which will faithfully follow control pulses having time durations as small as 0.001 second, and which is characterized by negligible delay in operating and restoring itself to normal.

A further object is to provide an efficient and fast operating electronic keying device which employs relatively inexpensive vacuum tubes of nominal size, and which can conduct large currents and still remain within allowable limits of anode heat dissipation.

A still further object is to provide an electronic keying device for a power oscillator, utilizing relatively inexpensive electronic tubes of nominal size arranged in an electrical circuit of such novel design as to obtain a large current flow with operating voltages which are only a small fraction of the voltage values normally required to obtain the same current flow in these tubes.

Still another object is to provide an electronic keying device for a power oscillator which automatically applied a holding bias to the oscillator tube to prevent intermittent oscillations in the stand-by (idle) period.

A more detailed description of the electronic keying device of the invention follows in conjunction with a drawing whose single figure illustrates the electronic keyer as used in keying a power oscillator. It should be understood that this application of the electronic keyer equipment is given by way of example only, and that the invention may be used wherever there is need for a keyer which will faithfully and accurately follow short duration control pulses and provide instantaneous switching of the load current.

Referring to the drawing, there is shown an electronic keyer device comprising essentially three vacuum tubes N, P and Q which are controlled by a novel type of trigger circuit comprising vacuum tube M. The keyer device is controlled by input pulses supplied to the primary winding of a pulse transformer T1. These input pulses may originate from an interval timer circuit capable of supplying pulses ranging in duration from 0.001 second to 0.5 second. One such interval timer is described in my copending application Serial No. 643,362, filed January 25, 1946. The electronic keyer of the invention is shown keying a Colpitts type of power oscillator OSC which, by way of illustration, may be an industrial type oscillator capable of generating 50 kilowatts of radio frequency energy for induction heating purposes. The electronic keyer device serves to interrupt (make and break) the grid circuit of the power oscillator.

In circuit with the electronic keyer are separate rectifier circuits 9, 10 and 11 fed in common from a transformer T2 whose primary winding, in turn, is coupled to the secondary winding of an isolation transformer T3, the latter in turn being supplied with 230 volts power supply. The isolation transformer T3 prevents undesired high voltage surges occurring in the load from entering the power supply. Similarly, pulse input transformer T1 also acts as an isolation transformer to prevent undesired high voltage surges which may occur in the grid circuit of the oscillator load from affecting the interval timer or source of input pulses.

Vacuum tube M comprises two triode electrode sections X and Y. The anodes are supplied with positive polarizing potentials of 150 volts relative to the cathodes, through resistors R1 and R2, by means of a source of constant voltage supply comprising rectifier 9 and a voltage regulator tube 19. The anode of electrode section Y is connected to the grid by electrode section X through a 1 microfarad condenser C1. The grid of electrode section X is connected to its cathode through resistor R4. A common cathode resistor R3 for both electrode sections X and Y connects the cathodes to one terminal of the secondary winding of pulse input transformer T1. The other terminal of the secondary winding of pulse transformer T1 is connected to the grid of the Y electrode section.

Resistor R1 has a considerably greater resistance than resistor R2, while resistor R4 has a considerably greater resistance than resistor R3. By way of illustration, resistor R1 may be 100,000 ohms, resistor R2 may be 15,000 ohms, resistor R4 may be 452,000 ohms, and resistor R3 may be 3,000 ohms.

Normally, in the absence of a positive pulse supplied to the grid of the Y electrode section from the transformer T1, there is a flow of current through the X section of tube M which causes a voltage to be developed across the common cathode resistor R3 of a magnitude sufficient to bias the Y electrode section beyond cut off. The fact that resistor R2 is of considerably lower resistance than resistor R1 assures a sufficient flow of current through the X electrode section and through common cathode resistor R3 to develop a voltage which supplies the desired negative bias to the grid of the Y electrode section. The flow of current through the X electrode section causes a voltage of about 78 volts to be developed across resistor R2, due to the IR drop in this resistor. Condenser C1, connected between the grid of the X electrode section and the anode of the Y electrode section, is charged up to a value equal to the potential drop across the anode and cathode of the Y electrode section, and this potential drop may amount to about 135 volts, which is a value obtained by subtracting from the 150 volts supplied by rectifier 9 to the anode, the voltage drop across resistor R3, caused by the flow of current therethrough due to conduction in the X electrode section and which voltage drop may amount to about 15 volts.

The operation of vacuum tube circuit M is somewhat similar to a trigger circuit having one degree of electrical stability and operates in a manner similar to that of the electronic interval timer described in my copending application Serial No. 643,362, supra, except for the fact that the condenser C1 replaces the capacitor decade unit of the electronic interval timer, and also that condenser C1 and resistor R4 have a long time constant. While the X electrode section of the trigger tube M is conductive, the 78 volt drop in resistor R2 supplies a negative bias to the grids of the vacuum tubes N and P relative to their cathodes by virtue of the connection 20 which extends to the grids of the tubes N and P through resistors R5 and R6. This negative bias on the grids of N and P is of sufficient magnitude to prevent the flow of current through vacuum tubes N and P.

It should be noted that the cathodes of vacuum tubes N and P are connected together and also connected to the grid of vacuum tube Q through connection 21. The anodes of vacuum tubes N, P and Q are also connected together. In the normal condition of the electronic keyer device of the invention, the X electrode section of twin triode tube M is conductive while vacuum tubes N, P and Q are non-conductive. As mentioned before, tubes N and P are supplied with a negative bias over lead 20 due to the 78 volt drop in resistor R2 when the X electrode section is conducting. Vacuum tube Q, however, has a negative bias of 100 volts supplied to its grid by the voltage drop across resistor R15 caused by the rectified voltage supplied thereto by rectifier 10. Rectifier 11 supplies a voltage of 1,000 volts across the anode and cathode of tube Q through connections 22 and 23, with the positive side connected to the anode of the tube, and the negative side connected to the cathode. This circuit arrangement produces an effective negative bias on terminal 2 which is connected to the grid of the power oscillator tube OSC which is being keyed. It should be noted that the grid of the oscillator tube is connected to terminal 2 through a choke 24 and a grid leak resistor 25. This negative bias voltage on terminal 2 prevents the occurrence of intermittent low amplitude oscillations from the oscillator (sometimes called motorboating), which might otherwise exist in the oscillator, during key up or stand by periods.

The anode-to-cathode potential of tubes N and P is 1100 volts which is the sum of the voltages of 1000 volts supplied by rectifier 11 and 100 volts caused by the IR drop across resistor R15. The screen grids of tubes N and P are supplied with 250 volts relative to their cathodes, through resistors R7 and R8, respectively, which are connected through inductor L1 to a rectifier 10.

The operation of the system of the electronic keyer device will now be given in greater detail. The application of an input pulse to the primary winding of transformer T1 from an interval timer or any suitable source will cause a positive pulse to be applied to the grid of the Y electrode section of sufficient magnitude to cause this Y electrode section to conduct. In practice, if an interval timer such as used in my copending application supra is employed as an input source, it will be the interruption of the output of the interval timer which will cause the application of a positive pulse to the grid of the Y electrode section. When the Y electrode section conducts, the anode-cathode voltage of this electrode section is reduced from a value of about 135 volts to the normally conductive drop through the Y electrode section. At the instant the Y electrode section starts to conduct, the grid of the X electrode section is biased negatively by an amount sufficient to cut off the flow of the current through the X electrode section, due to the 135 volt charge on the capacitor C1. With the values of the various elements assumed above, the grid of the X section may be biased negative relative to its cathode by an amount of about 72 volts which is the voltage drop across resistor R4. During the time the Y electrode section conducts and the X electrode section is biased beyond cut-off, the output voltage across resistor R2 is zero. Hence it will be seen that the 78 volts drop normally present across resistor R2 is removed when the X electrode section is cut off and consequently the negative bias is removed from the grids of the vacuum tubes N and P. The changes in voltage across resistor R2 are instantaneous in comparison to the time interval range over which the keyer is to be used. To assure the fact that the X electrode section is cut-off over all interval ranges of input pulses supplied by the interval time, the capacitor C1 and the grid leak R4 are purposely given a long time constant.

When the interval timer constituting the input circuit restores itself to normal, the current in the primary winding of transformer T1 produces a negative pulse on the grid of the Y section of sufficient magnitude to drive the Y section beyond cut off and cause the X electrode section to conduct. The arrangement of the trigger circuit involving tube M is such that the X electrode section appears non-conducting only for the exact time interval of interruption of the interval timer over the wide range of the capacitor decade unit in this interval timer. Since the interval timer or source of input pulses may have periods ranging in duration from 0.001 second to 0.5 second, the X electrode section will remain non-conducting for the exact time duration of the input pulse, or interruption of the current in the primary winding circuit of the transformer T1.

The removal of the negative bias on the grids of tubes N and P when the X electrode section ceases conducting, causes the anode-cathode impedance of tubes N and P to be reduced from a value near infinity to a nominal value. This is because the screen grids of tubes N and P have a positive voltage of 250 volts applied thereto relative to their cathodes, and the reduction of the negative grid bias on these tubes N and P to the zero value causes these tubes to conduct. It should be noted that vacuum tubes N and P are shunted across the anode-to-grid path of vacuum tube Q; hence, the reduction in the anode-to-cathode impedance of tubes N and P will reduce the anode-to-grid impedance of tube Q, in turn causing tube Q to conduct by virtue of a positive potential supplied to the grid of tube Q through tubes N and P.

As the grid of tube Q moves from a negative to positive potential by virtue of the action of tubes N and P, the resulting lowered anode-cathode impedance of tube Q causes rectifier 11 to supply anode current to tube Q which flows through resistor R13. Resistor R13 has a relatively large ohmic value and the current flowing therethrough produces 100% regulation in the output voltage of the rectifier 11. Because resistor R13 is large in value, there is a very large voltage drop thereacross which removes the effective negative bias from terminal 2 and the grid of the oscillator tube OSC, thus providing a very low impedance circuit to the flow of current in the grid circuit of the oscillator tube. The oscillator grid current flows in paths as shown by the arrows on the drawing. A portion of this total current flows through resistors R9 and R15 in such direction as to nullify the negative voltage drop across R15 due to current supplied from rectifier 10, by an amount equal to the positive grid-cathode voltage of tube Q.

The electronic keyer device of the invention is so designed that it enables tube Q to conduct a large value of current and yet remain below the allowable anode dissipation. Tubes N and P carry some of the load current across the terminals 1 and 2, since the tube Q is driven between grid and anode instead of the conventional method of driving a tube between the grid and cathode.

Tubes N and P enable the bias on the grid of tube Q to go from a negative value under cut-off conditions to a positive driving voltage (between anode and grid) of relatively small value under conduction conditions. This permits tube Q to conduct a large anode-cathode current and yet remain within the allowable anode dissipation values.

With an oscillator tube adapted to generate about 100 kilowatts, the current required is about 0.9 to 1.0 amperes. It is difficult to find a low impedance vacuum tube of reasonable cost which will conduct large currents and still remain within the allowable limits of anode dissipation. As an illustration, tube Q, according to present commercial values, costs about $70.00; while the oscillator tube costs about $800.00. By means of the electronic keyer device of the invention, there is obtained a flow of current of about one ampere through tube Q (anode-to-cathode path) and a flow of one-quarter of an ampere or thereabouts through tubes N and P. Tubes N and P cost about $2.50 each. It will thus be appreciated that I have been able to provide a relatively inexpensive electronic keyer circuit which is not only highly efficient and able to carry relatively large currents, but also accurately and faithfully follows the control pulses applied thereto and provides instantaneous switching of the load current.

At the present time, there is no available vacuum tube of nominal size which will conduct a large anode-to-cathode current at zero grid bias and stay within the allowable anode dissipation limits. Under conventional practice, in order to get one ampere of current through tube Q it would require 3250 volts on the anode at zero grid bias. This will give 3250 watts, whereas only 300 watts are permissible within the limits of the tube. With the arrangement of the present invention, however, I am able to get one ampere of current through tube Q with a grid-cathode voltage of 97 volts and with 255 watts of anode dissipation, whereas 300 watts are allowable in the design of the tube. When the ratio between the keying period and stand by period is great enough to make the average grid and plate dissipation less than maximum value, the current rating of this keying unit may be doubled.

What is claimed is:

1. An electronic keyer device comprising a pair of screen grid tubes each having a cathode, a control grid, a screen grid and an anode, a third electron tube having an anode, a grid and a cathode, direct current connections between corresponding electrodes of said screen grid tubes, a direct current connection of low impedance and devoid of concentrated impedance between the anode of the third tube and the anodes of the screen grid tubes, a direct current connection between the grid of the third tube and the cathodes of said screen grid tubes, as a result of which said screen grid tubes are connected in shunt to the anode-grid impedance of said third tube, a source of unidirectional current having its positive terminal connected to the screen grids of said pair of tubes and its negative terminal connected to the cathodes of said pair of tubes, means including said source for supplying a bias voltage to the grid of said third tube of such magnitude as to prevent the flow of current through said third tube, another source of unidirectional current supplying polarizing potential to the anodes of all three tubes, means for developing a negative bias on the control grids of said screen grid tubes of such value as to prevent the flow of current through said screen grid tubes, and means for suddenly reducing this last negative bias to such a value as to permit current to flow through said screen grid tubes, as a result of which the anode-cathode impedance of said screen tubes is reduced and hence the anode-grid impedance of the third tube is reduced and current flows through the third tube.

2. An electronic keyer device comprising a screen grid tube having a cathode, a control grid, a screen grid, and an anode, a second tube having an anode, a grid and a cathode, a direct current connection of low impedance and devoid of concentrated impedance between the anodes of said two tubes, a direct current connection of low impedance and devoid of concentrated impedance between the cathode of the screen grid tube and the grid of the second tube, as a result of which said screen grid tube is connected in shunt to the anode-grid impedance of said second tube, a source of unidirectional current having its positive terminal connected to said screen grid and its negative terminal to the cathode of said screen grid tube, means including said source for supplying a bias voltage to the grid of said second tube of such magnitude as to prevent the flow of current through said second tube, another source of unidirectional current supplying polarizing potential to the anodes of both tubes relative to their cathodes, means for developing a negative bias on the control grid of said screen grid tube of such value as to prevent the flow of current through said screen grid tube, and means for suddenly reducing this last negative bias to such a value as to permit current to flow through the screen grid tube, to thereby reduce the anode-grid impedance of said second tube and cause current to flow through said second tube.

3. An electronic keyer device comprising a first vacuum tube having an anode, a cathode and a grid, a second vacuum tube having its space path connected directly across the anode and grid of said first tube through paths devoid of concentrated impedances, a source of unidirectional potential for supplying said anode with a positive potential relative to said cathode, a load circuit to be keyed coupled between said cathode and anode, means for biasing said first tube to cut-off, means for biasing said second tube to cut-off, and means for reducing the bias on said second tube to a value sufficient to enable current to flow through its space path, to thereby overcome the cut-off bias on said first tube and cause current to flow through said first tube.

4. An electronic keyer device comprising a first vacuum tube having an anode, a cathode and a grid, a second vacuum tube having its space path directly connected across the anode and grid of said first tube through paths devoid of concentrated impedance, a source of unidirectional potential for supplying said anode with a positive potential relative to said cathode, a load circuit to be keyed coupled between said cathode and anode, means for biasing said first tube to cut-off, a trigger circuit having one degree of electrical stability, connections from said trigger circuit to said second tube so arranged as to supply during the stable state of said trigger circuit a bias voltage to said second tube which prevents current flow over the space path of the tube, and means for tripping said trigger circuit for short periods of time whose durations are less than one second, to thereby reduce the bias voltage on said second tube and cause current to flow therethrough.

5. An electronic keyer device comprising a first vacuum tube having an anode, a cathode and a grid, a second vacuum tube having its space path connected across the anode and grid of said first tube, a rectifier circuit coupled to the anode and cathode of said first tube for supplying a positive potential to said anode, a power oscillation generator adapted to be keyed and having its grid coupled to the cathode of said first tube, means including a second rectifier circuit for biasing said first tube to cut-off, a trigger circuit comprising a pair of electrode structures so interconnected and having such time constants that it has one degree of electrical stability, a connection from one of said structures to said second tube to supply a cut-off bias to said second tube during the stable state of said trigger circuit, a pulse input transformer for said trigger circuit for supplying tripping pulses to said trigger circuit, whereby the cut-off bias for said second tube is removed during the active state of said trigger circuit, another rectifier circuit for supplying operating voltages to said trigger circuit, a source of power supply for said rectifier circuits, and an isolation transformer between said source and said rectifier circuits.

6. An electronic keyer device comprising a pair of screen grid tubes each having a cathode, a control grid, a screen grid and an anode, a third electron tube having an anode, a grid and a cathode, direct current connections between corresponding electrodes of said screen grid tubes, a direct current connection devoid of concentrated impedance between the anode of the third tube and the anodes of the screen grid tubes, a direct current connection devoid of concentrated impedance between the grid of the third tube and the cathodes of said screen grid tubes, as a result of which said screen grid tubes are connected in shunt to the anode-grid impedance of said third tube, a source of unidirectional current having its positive terminal connected to the screen grids of said pair of tubes and its negative terminal connected to the cathodes of said pair of tubes, means including said source for supplying a bias voltage to the grid of said third tube of such magnitude as to prevent the flow of current through said third tube, another source of unidirectional current supplying polarizing potential to the anodes of all three tubes, a trigger circuit having one degree of electrical stability, said trigger circuit comprising a pair of interconnected electrode structures one of which is normally conducting and the other non-conducting in the stable state of the trigger circuit, and vice versa in the active state of the trigger circuit, circuit connections from the normally conductive electrode structure to the control grids of said screen grid tubes for applying a negative cut-off bias to said control grids, and means including a pulse transformer for applying tripping pulses to said trigger circuit, whereby the cut-off bias on the control grids of said screen grid tubes is removed when the trigger circuit is tripped from its stable to its active state.

LOUIS A. KING.

REFERENCES CITED

The following references are of record in the file of this patent:

UNITED STATES PATENTS

| Number | Name | Date |
|---|---|---|
| 1,849,865 | Davis | Mar. 15, 1932 |
| 1,873,786 | Ranger | Aug. 23, 1932 |
| 2,262,838 | Deloraine et al. | Nov. 18, 1941 |
| 2,335,278 | Hilferty | Nov. 30, 1943 |
| 2,408,230 | Shoupp | Sept. 24, 1946 |
| 2,435,331 | Street | Feb. 3, 1948 |

OTHER REFERENCES

Review of Scientific Instruments, vol. 14, June 1943, "An Improved Cosmic-Ray Radio Sonde," by Pickering, pages 171–173.